United States Patent [19]

Hawley et al.

[11] Patent Number: 4,794,960

[45] Date of Patent: Jan. 3, 1989

[54] PRESSURE FUEL NOZZLE

[75] Inventors: Frank D. Hawley, Mt. Clemens; Russell L. Rogers, Munith; Alan R. Allread; Paul J. E. Fournier, both of Jackson, all of Mich.

[73] Assignee: Aeroquip Corporation, Jackson, Mich.

[21] Appl. No.: 36,895

[22] Filed: Apr. 9, 1987

[51] Int. Cl.$^4$ .............................................. B65C 3/00
[52] U.S. Cl. ..................................... 141/384; 141/113; 137/614.2; 137/351
[58] Field of Search ............... 141/113, 384, 383, 386, 141/382, 346, 348, 349, 350, 351, 352, 353; 137/614.02, 614.03, 614.04, 614.06, 553; 285/168; 251/168, 89, 89.5

[56] References Cited

U.S. PATENT DOCUMENTS

| | | | |
|---|---|---|---|
| 2,665,925 | 1/1954 | Fraser | 137/614.02 |
| 2,665,926 | 1/1954 | Fraser | 137/614.02 |
| 2,680,030 | 6/1954 | Hoelzer | 137/614.06 X |
| 2,737,401 | 3/1956 | Lindsay | 137/401 |
| 2,753,884 | 7/1956 | Lindsay | 141/349 |
| 3,045,721 | 7/1964 | Shepherd et al. | 141/346 |
| 3,055,405 | 9/1962 | Pase | 141/384 X |
| 3,086,565 | 4/1963 | Mosher | 141/347 |
| 3,168,125 | 2/1965 | Rosell | 141/346 |
| 3,330,313 | 7/1967 | Rosell | 141/384 |
| 3,441,055 | 4/1969 | Pickell | 137/614.06 |

OTHER PUBLICATIONS

"Thiem Aircraft Refueling Equipment", by Thiem Industries, Inc., Sante Fe Springs, CA, Oct. 1985.
"The Model 428 Pressure Fueling Nozzle", by J. C. Carter Company, Inc., Costa Mesa, CA, Jan. 1986.
"Aircraft Refueling Equipment Underwing Refueling Nozzles", by Parker Hannifin Corporation, Irvine, CA, Aug. 1982, pp. A100.1C and A100.2A.
"Military Specification Coupling-Strainep", by Emco-Wheaton, Jul. 1972, Section G, pp. 231-232.
"Fast-Fueling Nozzle", by Parker Aircraft Co., Los Angeles, CA, Aug. 1961, Catalog File 1326A12, pp. 1-8.

Primary Examiner—Henry J. Recla
Assistant Examiner—Ernest G. Cusick
Attorney, Agent, or Firm—Beaman & Beaman

[57] ABSTRACT

A fueling nozzle for pressurized fuel systems having a body connectable to a tank inlet. The body includes an axially displaceable valve movable between a closed retracted position and an extended open position. Connection of the body to the tank inlet occurs upon rotation of the connection sleeve and positioning of the valve is achieved by a rotatable cam sleeve having a cam slot in which a valve-mounted follower is located. An interlock senses mounting of the body on the tank inlet permitting rotation of the connection sleeve in a locking direction and upon the connection sleeve being fully rotated to a locked condition a second interlock permits rotation of the cam sleeve and valve movement from the closed to the open position. The nozzle is characterized by reduced flow resistance characteristics and safe operation.

5 Claims, 3 Drawing Sheets

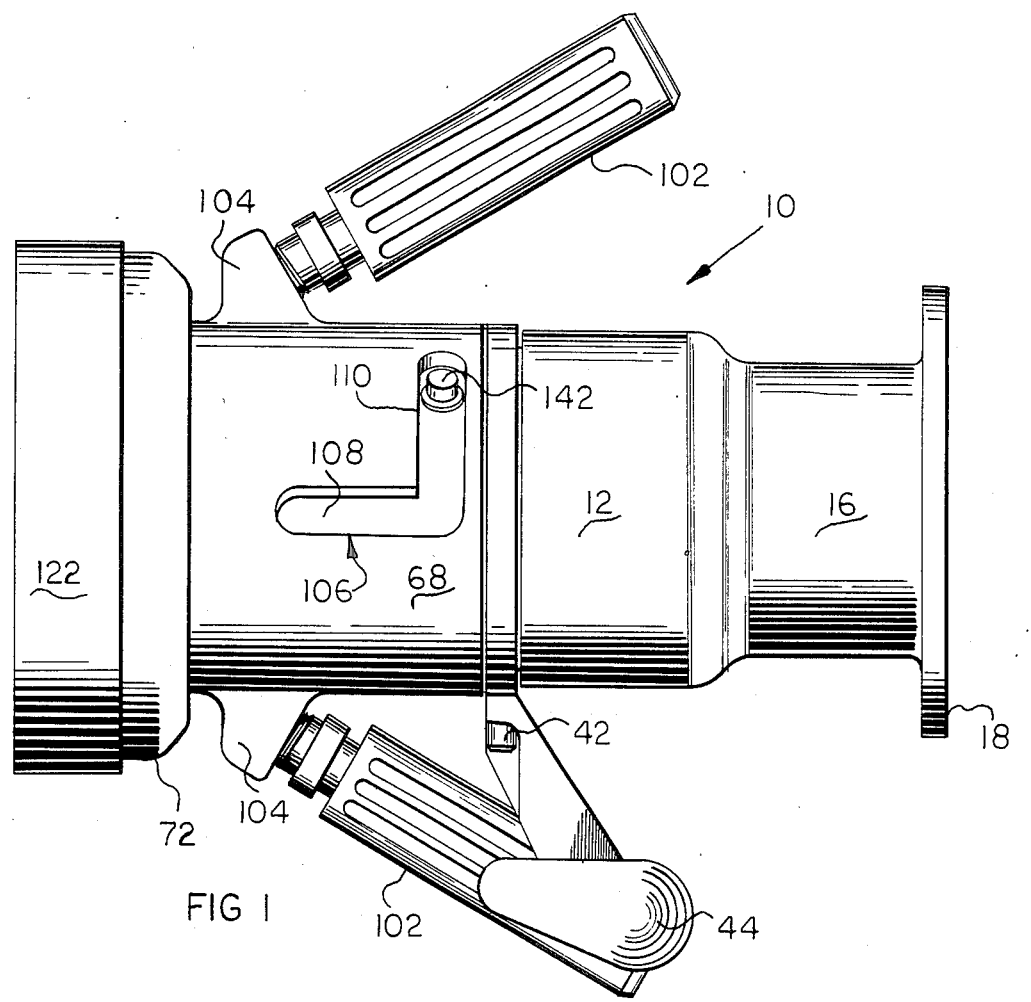
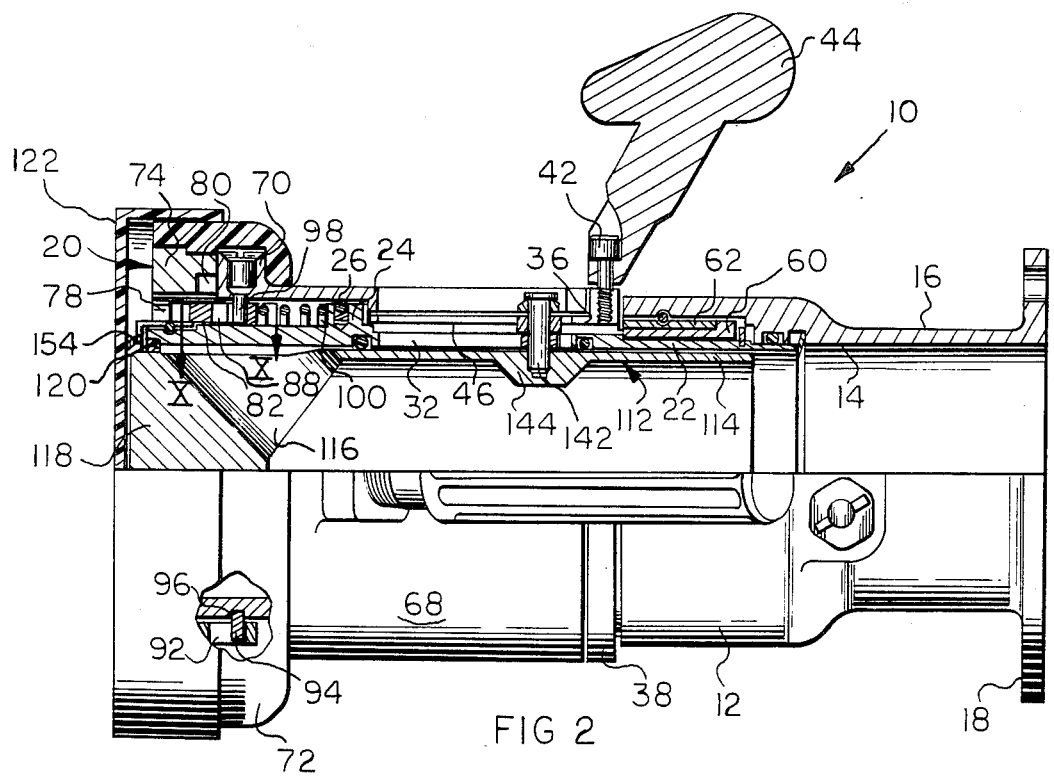

PRESSURE FUEL NOZZLE

BACKGROUND OF THE INVENTION

The refueling of commercial airplanes is accomplished through pressurized fuel systems. The tank inlet on the airplane is usually located under the wing, and a nozzle mounted on the end of a supply hose is attached to the tank inlet and includes a valve which displaces the tank inlet valve as the nozzle valve is opened to permit the flow of fuel through the nozzle and through the tank inlet. Such aircraft refueling nozzles must include safety devices to prevent fuel spillage, and be as foolproof and trouble-free as possible.

Present aircraft fueling nozzles utilizing retractable and extendable valves locate valve actuating structure within the valve flow passage causing a restriction with respect to fuel flow, and the location of actuating and control parts within the fuel passage presents the possibility of loose nozzle parts entering the fuel system and flowing into the aircraft fuel tank.

It is an object of the invention to provide a improved fuel nozzle for pressurized fuel systems such as utilized with aircraft wherein fuel flow through the nozzle is substantially unrestricted and valve actuating apparatus is removed from the flow passage.

Another object of the invention is to provide a pressurized fuel nozzle having an extendable and retractable valve wherein the operation of the valve is positive and trouble-free and wherein the operator may readily discern the valve position during all conditions of operation.

A further object of the invention is to provide a fuel nozzle for a pressurized fuel system having a retractable and extendable valve wherein the valve operator is rendered inoperative until the nozzle is fully connected and locked to the tank inlet.

Yet another object of the invention is to provide a fuel nozzle for pressurized fuel systems wherein a rotatable connection sleeve is mounted on the nozzle body rotatable between nozzle connecting and disconnecting positions, and the nozzle includes an interlock sensing the placing of the nozzle on the tank inlet and rotation of the connection sleeve to the locked condition cannot occur until the nozzle is properly aligned, oriented and located upon the tank inlet.

An additional object of the invention is to provide a fuel nozzle for a pressurized fuel system having an extendable and retractable valve positionable between open and closed conditions wherein an interlock prevents the nozzle from being disconnected from the tank inlet until the nozzle valve has been closed.

In the practice of the invention the fuel nozzle is adapted to be attached to a standard aircraft tank inlet. Such an inlet includes a self-sealing valve and lugs which cooperate with a bayonet-type connection on the nozzle permitting the fueling nozzle to be attached to the inlet. The nozzle includes an annular body having a flow passage defined therein and a connection end for mounting upon the tank inlet.

A connection sleeve concentrically rotatably mounted upon the nozzle body includes a bayonet connection for cooperating with the inlet lugs and placing of the nozzle end upon the tank inlet and rotation of the connection sleeve will lock the nozzle body to the tank inlet. A sensing ring concentrically mounted upon the nozzle engages the tank inlet and is axially displaced relative to the nozzle body upon the nozzle being aligned with the tank inlet and axially inserted thereon. Displacing of the sensing ring permits rotation of the connection sleeve on the body and insures that the nozzle is fully connected to the tank inlet prior to the nozzle valve being opened.

The nozzle passage includes an axially displaceable annular valve which closes the nozzle body passage to fluid flow in a retracted position, and permits fluid flow through the nozzle when the valve is extended. A rotatable valve actuator on the body includes a cam cooperating with a cam follower affixed to the valve wherein rotation of the cam actuator, which is in the form of an annular cam sleeve, axially displaces the valve relative to the body. Extension of the nozzle valve automatically displaces the tank inlet valve to an open condition permitting fluid flow through the nozzle into the tank. An interlocking slot defined in the connection sleeve also receives the cam follower and the configuration of the interlock slot on the connection sleeve prevents operation of the valve cam sleeve until the connection sleeve has been rotated on the body to the nozzle fully connected position.

Accordingly, the interlocks defined on the nozzle body prevent the nozzle valve from being opened until the nozzle is fully connected to the tank inlet, and the nozzle cannot be removed from the tank inlet until the nozzle valve has been closed.

The nozzle valve is of a hollow annular configuration free of internal actuating structure or components, and the connection sleeve and the valve cam sleeve are concentrically related to the valve body axis permitting the valve to be of a concise configuration, easily operable and handled, and economically manufacturable.

BRIEF DESCRIPTION OF DRAWINGS

The aforementioned objects and advantages of the invention will be appreciated from the following description and accompanying drawings wherein:

FIG. 1 is an elevational view of a fuel nozzle in accord with the invention illustrating the components in the valve closed condition, FIG. 2 is a partially sectioned elevational view taken through the cam sleeve operating handle and cam follower illustrating the nozzle components in the closed position.

DESCRIPTION OF THE PREFERRED EMBODIMENT

Figure 3:
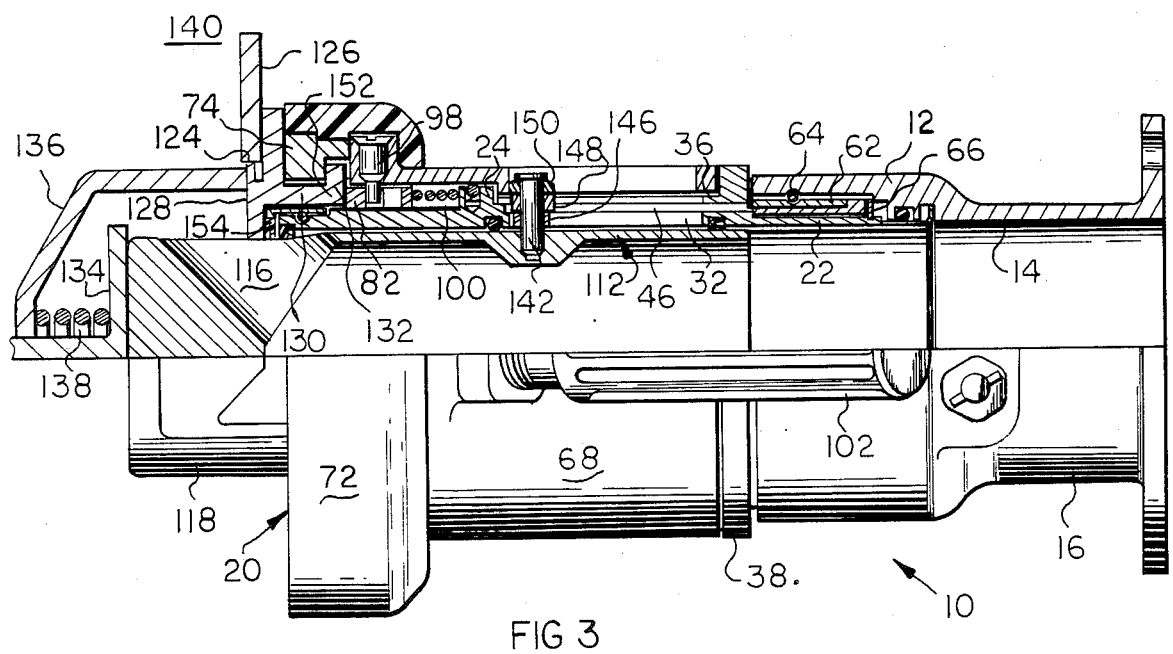
FIG. 3 is an elevational view, partially sectioned, similar to FIG. 2, illustrating the nozzle connected to the tank fuel inlet and illustrating the nozzle components in the fully opened condition.

With reference to FIGS. 1-3, a fueling nozzle 10 in accord with the invention includes a generally cylindrical body 12 of tubular configuration having a flow passage 14 defined therein of cylindrical form including a longitudinal axis. The body includes an extension 16, which may be linear or annular, defining the nozzle inlet end, and a flange 18 formed upon the extension constitutes conduit attachment means and includes holes whereby the flange may be attached to a flexible fuel supply hose, not shown, as conventionally known. The opposite end of the body 12 is designated the outlet end 20 and the nozzle passage intersects each end of the body.

Figure 4:
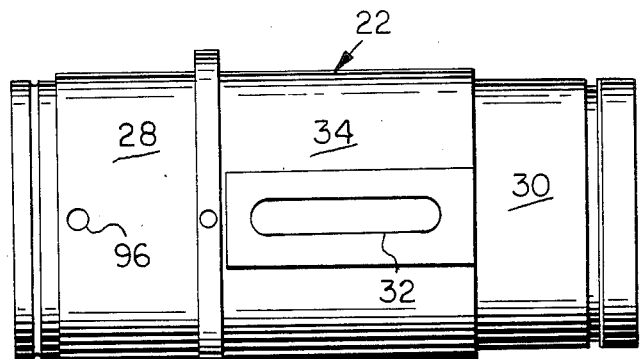
FIG. 4 is an elevational view of the valve sleeve, per se.

Internally, the body encloses a cylindrical tubular valve sleeve 22 sealed within the passage 14 by O-rings, and the configuration of the valve sleeve is best appreciated from FIG. 4. The valve sleeve includes an internal cylindrical bore having O-ring receiving grooves defined therein for sealing the valve therein as later described, and externally, the valve sleeve includes an annular shoulder 24 having a pair of diametrically located recesses for receiving the spring biased continuity balls 26, FIG. 2. Also, the valve sleeve includes a cylindrical surface 28, a cylindrical surface 30 and a linear slot 32 defined in cylindrical surface 34 which is parallel to the valve sleeve axis, which is coincident with the body passage axis.

Figure 5:
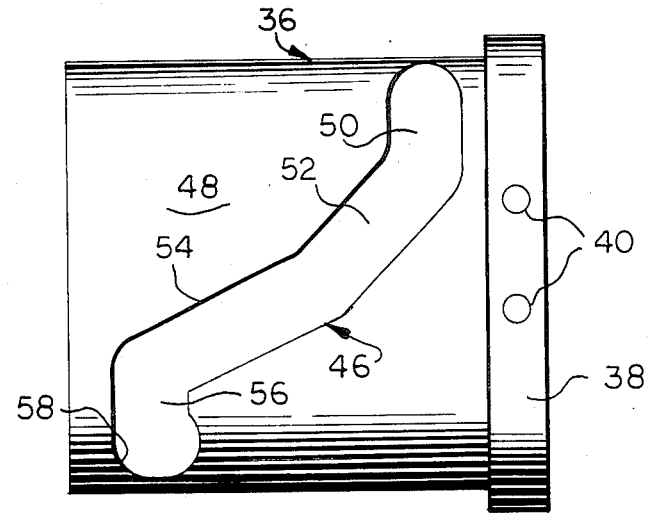
FIG. 5 is an elevational view of the cam sleeve, per se.

A cam sleeve 36 is rotatably mounted upon the valve sleeve surface 34. The cam sleeve includes an end which engages the valve sleeve shoulder 24 and an annular flange 38 is homogeneously defined on the other end of the cam sleeve extending radially from the general configuration thereof and includes threaded holes 40, FIG. 5, for receiving bolts 42 whereby the cam sleeve operating handle 44 may be affixed to the cam sleeve for rotation thereof. The cam sleeve includes a cam slot 46 defined through the wall of the cam sleeve cylindrical portion 48, and the cam slot includes the transverse portion 50, the intermediate portions 52 and 54 and the transverse portion 56 which includes the enlarged cavity 58.

The valve sleeve 22 and cam sleeve 36 are maintained within the body passage 14 by means of rings 60 and 62, FIG. 2, and the ring 62 is affixed to the body by a drive wire 64 received within opposed grooves defined in the body 12 and the ring 62. A snap ring 66 received within a groove defined in the valve sleeve axially aligns with the ring 60, and as the rings 60 and 62 are also in axial alignment with the cam sleeve, axial location of the valve and cam sleeves within the passage 14 is achieved.

Figure 6:
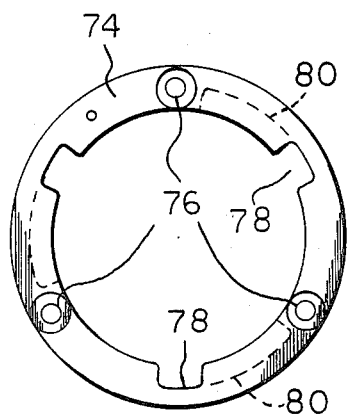
FIG. 6 is an end elevational view of the connection sleeve locking ring.

The connection sleeve 68 is rotatably mounted upon the valve sleeve 22 and the cam sleeve 36 and includes an inner end disposed adjacent the cam sleeve flange 38, and the outer end of the connection sleeve includes annular shoulder 70 over which the neoprene bumper 72 is located and encompasses. The bumper 72 prevents impact damage from occurring at the outlet end 20 of the body. The tank inlet connection means includes the annular lug adapter 74 which is attached to the connection sleeve shoulder 70 by three screws extending through holes 76, FIG. 6, and the lug adapter includes three bayonet connection notches 78, FIG. 6, each in communication with the arcuate cam recesses 80 for cooperation with the tank inlet adapter, as known. The bumper 72 circumferentially encompasses the lug adapter 74 for the protection thereof.

A sensing ring 82 comprises the tank inlet sensing means and is mounted upon the valve sleeve surface 28 for axial displacement thereon. The sensing ring includes several axially extending projections 84 which cooperate with notches defined in the fuel inlet adapter, and the ring also includes the first interlock means in the form of a pair of slots 86, diametrically located, each of which includes a portion 88 parallel to the length of the ring circumference and a transverse portion 90 at right angles to the portion 88.

The sensing ring 82 also includes a pair of slots 92, FIG. 2, which extend transversely with respect to the ring circumference, and each of these slots, diametrically located, receive a pin 94 extending from the valve sleeve hole 96 which function as keys to prevent relative rotation between the valve sleeve 22 and the sensing ring 82.

Additionally, the connection sleeve 68 includes a pair of interlock pins 98 threaded into the shoulder 70 having a reduced diameter portion extending into the sensing ring slots 86. Compression spring 100 located between the sensing ring 82 and the valve sleeve shoulder 24 imposes a biasing force on the sensing ring toward the body outlet end 20.

Rotation of the connection sleeve 68 is accomplished through a pair of handles 102 threaded into bosses 104 homogeneously extending from the connection sleeve. The handles are large and of such dimension as to be easily grasped by the operator whereby the operator will use the handles to lift and position the nozzle 10 and associated hose. The connection sleeve also includes the second interlock means which is an interlock slot 106 having an axial portion 108 and parallel to the passage 14 and a transverse portion 110.

The nozzle valve, generally indicated at 112, is of a cylindrical tubular configuration and is reciprocally received within the valve sleeve 22. The valve 112 includes an axial flow passage portion 114 open at its right end, FIG. 2, in communication with the body passage 14, and at its left end the portion 114 communicates with oblique ports 116 intersecting the exterior of the valve adjacent the head 118. The head 118 includes a cylindrical surface cooperating with seal 120 formed in the valve sleeve whereby the outlet end of the body passage 14 is sealed when the valve 112 is in the retracted position shown in FIG. 2.

When the nozzle 10 is not in use the outlet end thereof may be protected by a dust cap 122 which is snapped onto the bumper 72 and protects the outlet end 20 of the nozzle from contamination by foreign matter.

The aforedescribed fueling nozzle is attached to a conventional tank inlet 124 as represented in FIG. 3. The tank inlet is defined in the bulkhead 126, and includes an adapter 128 affixed to the bulkhead having three axially extending lugs 130 each formed with a radially extending head 132. The tank inlet valve 134 is held in position by the spider 136, and a compression spring 138 biases the valve 134 into a sealed relationship with the inlet adapter 128, and displacement of the valve from the adapter permits fuel to flow into the tank generally indicated at 140, as described below.

A cam follower 142 is affixed to the valve 112 mounted within enlarged portion 144 and the cam follower extends through the valve sleeve slot 32, the cam sleeve slot 46, and the connection sleeve slot 106. A bushing 146 is located upon the cam follower for close sliding reception within the valve sleeve slot 32, cam follower bushing 148 is received within cam sleeve slot 46, and bushing 150 is received within connection sleeve slot 106.

Figure 7:
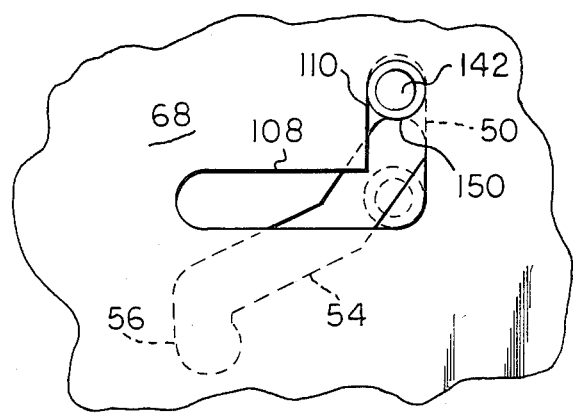
FIG. 7 is an enlarged, detail, elevational view illustrating the connection sleeve interlock slot and the cam follower showing the valve in the closed position in full lines and the cam follower position in dotted lines after rotation of the connection sleeve to the fully connected condition.

In operation, the nozzle components will normally be as shown in FIGS. 1 and 2. The previous cycle of nozzle use will have positioned the valve 112 to its retracted position, FIG. 2, locating the cam follower 142 at the right end of slot 32, the cam sleeve 36 will have been rotated such that the cam follower will be located in the cam portion 50, and the cam follower will be positioned at the closed end of the connection sleeve cam slot portion 110, as shown in full lines in FIG. 7. In this condition, the connection sleeve slot portion 110 functions as an interlock to prevent extension of the valve 112 as would permit flow from the nozzle. With the cam follower 142 within the cam slot portion 110 any attempt to rotate the cam sleeve 36 by handle 44 is prevented in that engagement of the cam follower with the angle portion 52 will tend to axially displace the cam follower in an axial direction toward the body outlet end 20 causing the cam follower to bind within the cam portion 110 preventing further rotation of the cam sleeve. Accordingly, intentional or accidental shifting of the valve 112 to the open position is prevented.

To use, the dust cap 122 is removed and the nozzle body 12 is aligned with the tank inlet adapter 128. The heads 132 of the lugs 130 are received within the lug adapter notches 78 and the nozzle body may be axially pushed onto the tank inlet adapter. This relative axial movement between the nozzle body and tank adapter produces engagement of the lug heads 132 with the sensing ring 82, and simultaneously the sensing ring projections 84 enter notches 152 defined in the tank adapter 128. The reception of the sensing ring projections within the adapter notches 152 prevents relative rotation between the nozzle body 12 and the tank adapter 128, and the axial displacement of the sensing ring 82 relative to the valve sleeve 22 shifts the pins 98 from engagement with the sensing ring slot portion 90 and aligns the pins with the slot portion 88. The alignment of the pins 98 with the slot portions 88 now permits the operator to rotate the connection sleeve 68 clockwise relative to the body 12 and such relative motion was previously prevented due to the reception of the pins 98 within the sensing ring slot portions 90. Such rotation of the connection sleeve 68 through handles 102 also rotates the lug adapter 74 relative to the lugs 130 misaligning the heads 132 with respect to the notches 78 wherein the heads 132 engage the oblique cam surfaces within recesses 80 to firmly attach the body 12 in sealed relationship to the tank adapter 128 by means of nozzle seals 154.

Figure 8:
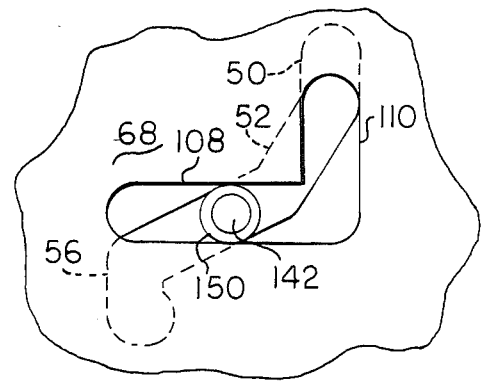
FIG. 8 is an enlarged, detail view similar to FIG. 7 illustrating the relationship of the connection sleeve interlock slot and the valve cam follower at an intermediate valve operating position.
Figure 9:
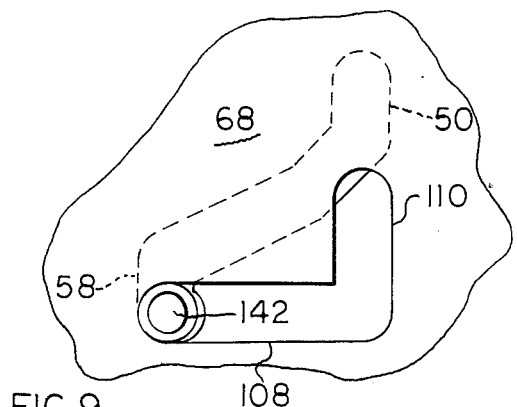
FIG. 9 is an elevational view similar to FIG. 7 illustrating the relationship of the connection sleeve interlock slot and the cam follower at the valve fully opened condition.

The locking rotation of the connection sleeve 68 upon the body 12 produces a relative movement between the connection sleeve and the cam follower 142. Such locking rotation of the connection sleeve will now position the cam follower 142 in the dotted line position shown in FIG. 7 in axial alignment with the connection sleeve slot portion 108. Such alignment now permits rotation of the cam sleeve 36 by rotation through operation of the handle 44. As the cam sleeve moves in a clockwise direction, the cam sleeve oblique slot portions 52 and 54 will displace the cam follower 142 toward the body outlet end 20 as shown in FIG. 8, and this displacing of the cam follower axially translates the valve 112 to the left, FIG. 3, extending the valve head 118 beyond the nozzle outlet end 20 into engagement with the inlet valve 134 unseating the valve 134 and permitting fluid flow from the nozzle 10 into the tank 140. Such rotation of the cam sleeve continues until the valve 112 is fully extended and opened and the cam follower engages the end of the connection sleeve slot portion 106 as shown in FIG. 9. In the position shown in FIG. 9 the valve is fully opened and the components are as shown in FIG. 3.

During the filling operation, as shown in FIG. 3, the nozzle 10 cannot be inadvertently removed from the tank adapter 128. The reception of the sensing ring projections 84 within the tank adapter notches 152 prevents relative rotation of the nozzle to the tank adapter, and accidental uncoupling of the nozzle from the tank adapter while the valve 112 is open and fuel is flowing through the nozzle cannot take place.

To disconnect the nozzle 10 from the tank adapter 128 the operator must, first, close the valve 112 by retracting the valve into the body 12. This operation is accomplished by rotating the cam sleeve 36 by means of its handle 44 in a counter-clockwise direction causing the cam sleeve cam portions 54 and 52 to displace the cam follower 142 to the right, reversing the sequence of operation described above. Movement of the cam follower to the right retracts the valve 112 into the body 12 to the fully closed position shown in FIG. 2, and in such condition the cam follower will be located at the dotted line position shown in FIG. 7, i.e. in alignment with the connection sleeve slot portion 110.

Figure 10:
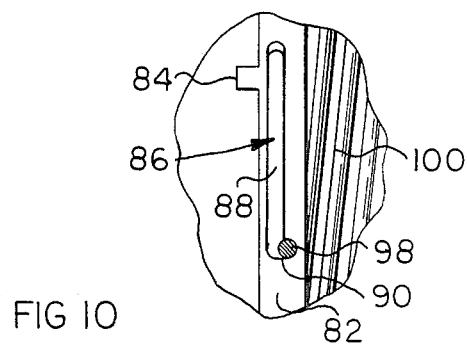
FIG. 10 is a detail, elevational view of the sensing ring and interlocking slot and pin as taken along Section X—X of FIG. 2.

Thereupon, the alignment of the cam follower with the slot portion 110 permits rotation of the connection sleeve 68 on the body 12 by means of handles 102, and this rotation permits alignment of the tank lug heads 132 with the nozzle adapter notches 78. Such rotation of the connection sleeve also aligns the pins 98 with the sensing ring slot portion 90, and as the nozzle is removed from the tank inlet the spring 100 biases the sensing ring outwardly locating the pins 98 within the sensing ring slot portion 90 as shown in FIG. 10. The disconnecting operation is now completed, the valve 112 has been fully closed and no leakage occurs. Of course, as the valve 112 retracts, the tank valve 134 closes and only minute quantities of fuel are spilled during disconnection. The dust cap 122 may be replaced, and the nozzle is now ready for its next use.

From the above description it will be appreciated that a fuel nozzle in accord with the invention utilizes a foolproof interlock system which prevents the nozzle from being opened unless the nozzle is fully connected to a tank inlet, and likewise, the nozzle interlocks prevent the nozzle from being removed from the tank inlet unless the nozzle valve is fully closed. The valve 112 is open throughout its length providing substantially unrestricted fluid flow therethrough and little pressure loss is experienced. Additionally, as the interior of the valve is free of actuating apparatus, the possibility of broken parts within the nozzle entering the fuel tank is substantially completely eliminated. The concentric relationship of the valve, valve sleeve, cam sleeve and connection sleeve permits the valve to be of a relatively concise configuration, and the nozzle components are of such shape as to be readily manufacturable on conventional machine equipment.

It is appreciated that various modifications to the inventive concepts may be apparent to those skilled in the art without departing from the spirit and scope of the invention.

We claim:

1. A fueling nozzle for use with a pressurized fuel conduit and a valved tank inlet comprising, in combination, a tubular body having an inlet end and an outlet end and a passage defined therethrough having a longitudinal axis and in communication with said ends, conduit attachment means defined on said inlet end, a tubular cylindrical valve axially displaceable within said passage between a retracted position sealing said passage and an extended position extending said valve from said body outlet end and opening said passage for fluid flow therethrough, a cam sleeve circumscribing said valve and rotatably mounted on said body, a first operating handle mounted on said cam sleeve for rotating said cam sleeve, a cam slot defined in said cam sleeve having a portion obliquely related to said passage axis, a cam follower mounted on said valve located within said cam slot whereby rotation of said cam sleeve axially displaces said valve between said retracted and extended positions, a connection sleeve rotatably mounted on said body substantially concentric to said passage axis rotatable between inlet connection and disconnection positions and having a connection end adjacent said body outlet end, a second operating handle defined on said connection sleeve for handling said body and rotating said connection sleeve, tank inlet connection means defined on said connection sleeve connection end, tank inlet sensing means defined on said body adjacent to said body outlet end sensing mounting of said outlet end upon a tank inlet and movable between a first tank inlet mounted position and a second tank inlet dismounted position, and first interlock means interposed between said sensing means and said connection sleeve permitting rotation of said connection sleeve relative to said body at said sensing means first position and preventing such relative rotation at said second position and second interlock means interposed between said connection sleeve and said cam sleeve preventing rotation of said connection sleeve on said body from said connection position to said disconnection position unless said valve is in said retracted position.

2. In a fueling nozzle as in claim 1, said second interlock means comprising a slot defined in said connection sleeve having an axial portion substantially parallel to said passage axis and a transverse portion transverse to said passage axis, said cam follower being located within said connection sleeve slot whereby said cam follower and valve is movable in the axial direction of said valve retracted and extended valve positions only when said cam follower is located within said slot axial portion, location of said cam follower within said slot transverse portion preventing rotation of said cam sleeve upon said body, said cam follower being located in said slot axial portion only upon said connection sleeve being rotated to said inlet connection position.

3. A fueling nozzle for use with a pressurized fuel conduit and a valved tank inlet comprising, in combination, a tubular body having an inlet end and an outlet end and a passage defined therethrough having a longitudinal axis and in communication with said ends, conduit attachment means defined on said inlet end, a tubular cylindrical valve axially displaceable within said passage between a retracted position sealing said passage and an extended position extending said valve from said body outlet end and opening said passage for fluid flow therethrough, a cam sleeve circumscribing said valve and rotatably mounted on said body, a first operating handle mounted on said cam sleeve for rotating said cam sleeve, a cam slot defined in said cam sleeve having a portion obliquely related to said passage axis, a cam follower mounted on said valve located within said cam slot whereby rotation of said cam sleeve axially displaces said valve between said retracted and extended positions, a connection sleeve rotatably mounted on said body substantially concentric to said passage axis rotatable between inlet connection and disconnection positions and having a connection end adjacent said body outlet end, a second operating handle defined on said connection sleeve for handling said body and rotating said connection sleeve, tank inlet connection means defined on said connection sleeve connection end, tank inlet sensing means defined on said body adjacent to said body outlet end sensing mounting of said outlet end upon a tank inlet and movable between a first tank inlet mounted position and a second tank inlet dismounted position, and first interlock means interposed between said sensing means and said connection sleeve permitting rotation of said connection sleeve relative to said body at said sensing means first position and preventing such relative rotation at said second position, said inlet sensing means comprising a nonrotatable annular ring mounted on said body adjacent said outlet end substantially concentric to said passage and axially displaceable between a first position indicating mounting of said inlet end upon a tank inlet and a second position when said inlet end is not mounted upon a tank inlet, said first interlock means comprising a slot defined in said ring and a pin mounted on said connection sleeve received within said ring slot, an abutment defined in said slot engaging said pin at said ring second position preventing rotation of said connection sleeve relative to said body, said pin being misaligned with respect to said abutment at said ring first position permitting rotation of said connection sleeve upon said body.

4. A fueling nozzle for use with a pressurized fuel conduit and a valved tank inlet comprising, in combination, a tubular body having an inlet end and an outlet end and a passage defined therethrough having a longitudinal axis in communication with said ends, conduit attachment means defined on said inlet end, a tubular cylindrical valve axially displaceable within said passage between a retracted position sealing said passage and an extended position extending said valve from said body outlet end and opening said passage for fluid flow therethrough, a cam sleeve circumscribing said valve and rotatably mounted on said body, a first operating handle mounted on said cam sleeve for rotating said cam sleeve, a cam slot defined in said cam sleeve having a portion obliquely related to said passage axis, a cam follower mounted on said valve located within said cam slot whereby rotation of said cam sleeve axially displaces said valve between said retracted and extended positions, a connection sleeve rotatably mounted on said body substantially concentric to said passage axis rotatable between inlet connection and disconnection positions and having a connection end adjacent said body outlet end, a second operating handle defined on said connection sleeve for handling said body and rotating said connection sleeve, tank inlet connection means defined on said connection sleeve connection end, interlock means interposed between said connection sleeve and said cam sleeve preventing rotation of said connection sleeve on said body from said connection position to said disconnection position unless said valve is in said retracted position.

5. In a fueling nozzle as in claim 4, said interlock means comprising a slot defined in said connection sleeve having an axial portion substantially parallel to said passage axis and a transverse portion transverse to said passage axis, said cam follower being located within said connection sleeve slot whereby said cam follower and valve is movable in the axial direction of said valve retracted and extended valve positions only when said cam follower is located within said slot axial portion, location of said cam follower within said slot transverse portion preventing rotation of said cam sleeve upon said body, said cam follower being located in said slot axial portion only upon said connection sleeve being rotated to said inlet connection position.

* * * * *